(12) United States Patent
Ward

(10) Patent No.: US 8,416,820 B1
(45) Date of Patent: Apr. 9, 2013

(54) ACTIVE LASER GUARDING SYSTEM

(75) Inventor: Stuart Ward, Bournemouth (GB)

(73) Assignee: Lasermet Limited, Bournemouth, Dorset (GB)

( * ) Notice: Subject to any disclaimer, the term of this patent is extended or adjusted under 35 U.S.C. 154(b) by 0 days.

(21) Appl. No.: 13/293,013

(22) Filed: Nov. 9, 2011

(51) Int. Cl.
*H01S 3/00* (2006.01)

(52) U.S. Cl. ............... 372/38.07; 372/38.02; 372/38.01

(58) Field of Classification Search ............... 372/38.07, 372/38.02, 38.01
See application file for complete search history.

(56) References Cited

U.S. PATENT DOCUMENTS

| | | | | |
|---|---|---|---|---|
| 6,028,723 | A * | 2/2000 | Smith | 359/885 |
| 6,652,778 | B1 * | 11/2003 | Twarowski | 252/582 |
| 2001/0038732 | A1 * | 11/2001 | Carlson | 385/19 |
| 2008/0112447 | A1 | 5/2008 | Wilhelmi et al. | |
| 2008/0218683 | A1 * | 9/2008 | Lam et al. | 351/117 |
| 2011/0260737 | A1 | 10/2011 | Hannweber et al. | |

FOREIGN PATENT DOCUMENTS

| | | |
|---|---|---|
| GB | 2108742 A | 5/1983 |
| GB | 2182746 A | 5/1987 |

OTHER PUBLICATIONS

International Search Report dated Apr. 12, 2012, issued by the International Searching Authority for corresponding European Application No. EP 11188501.

* cited by examiner

*Primary Examiner* — Kinam Park

(74) *Attorney, Agent, or Firm* — Klarquist Sparkman, LLP

(57) ABSTRACT

An active laser guarding system 1 comprises at least one screen 3 provided with at least two spaced apart conductors 7, 9 each defining a respective electrically conductive path that is electrically separate from the other. The screen 3 comprises material, at least between the two conductors 7, 9, which is arranged to carbonize when struck by a laser beam to form a further conductive path 19 which extends between, and electrically connects, the two conductors 7, 9. The system 1 further comprises a detector 15 operative to detect the further conductive path 19 so formed, the detector 15 being operative to generate a laser deactivation signal response to detecting the further conductive path 19.

11 Claims, 3 Drawing Sheets

ACTIVE LASER GUARDING SYSTEM

TECHNICAL FIELD

The present invention relates to an active laser guarding system and particularly but not exclusively relates to such a system for use in a laser enclosure.

BACKGROUND

Lasers are used increasingly in various processes including manufacturing processes, and often in materials processing. When a laser is used in a laser enclosure, which may, for example, be a relatively small enclosure cabinet, or a room in a building, the laser beam may be accidentally directly or indirectly incident on the walls, floors, or ceiling of the enclosure for example.

With the development of lasers with higher power it is becoming increasingly challenging to provide a safe containment that protects users and the surrounding environment from injury and damage from stray laser light. Modern high power lasers can readily cut through almost any material including steel and concrete for example.

The damage caused by a stray laser beam may include damage to the surface or appearance of the object, burning a hole right through the object, fire damage, or injury to an operator of the laser or any other person who is in the path of the laser beam. In fact a significant risk could be presented to persons who may be outside a room containing a laser who would be totally unprepared for the sudden emergence of the laser beam through the wall. Furthermore the risk is often heightened as most high power laser beams are infra-red and therefore invisible.

We have previously proposed an active laser guarding system comprising a protective screen provided with an electrically conductive path connected to a fail-safe circuit. If the laser beam is incident on part of the conductive path, the laser beam breaks the conductive path, and the fail safe circuit deactivates the laser beam.

However, it can be a problem with such a system that the path can remain conductive even after being struck by the laser beam, with the result that the fail-safe circuit does not, or does not always, deactivate the laser beam.

SUMMARY

The present invention stems from some work in trying to alleviate the above problem. Through this work, we have unexpectedly determined that the carbonisation that typically occurs at the area of incidence of the laser beam, can be sufficiently electrically conductive that the carbonisation electrically connects the broken conductive path, or serves to prevent the conductive path being broken at all. In such a circumstance, the conductive path continues to conduct electricity even after being hit by a laser beam, and this leads to the detector not deactivating the laser as it should do.

According to a first aspect of the invention there is provided an active laser guarding system comprising at least one screen provided with at least two spaced apart conductors each defining a respective electrically conductive path that is electrically separate from the other, the screen comprising material, at least between the two conductors, which is arranged to carbonise when struck by a laser beam to form a further conductive path which extends between, and electrically connects, the two conductors, the system further comprising a detector operative to detect the further conductive path so formed, the detector being operative to generate a laser deactivation signal response to detecting the further conductive path.

Preferably each conductor is elongate so as to extend along at least part of the screen. Most preferably each conductor extends across the entire screen.

More than two conductors may be provided.

Preferably the detector is also operative to detect whether a conductor is electrically broken and to generate the laser deactivation signal in response to detecting the broken conductor(s).

Preferably the screen comprises a printed circuit board (PCB).

Preferably the screen is of sheet form.

Preferably the screen comprises at least one connector to mate with a corresponding connector on another screen to enable the screen to be physically and electrically connected to another screen. This may be useful in forming a composite screen assembly comprised of multiple screens connected together to cover a larger area.

Preferably the connector comprises electrical sub connectors which connect the conductors of one screen to the conductors of an adjacent screen.

According to a second aspect of the invention there is provided a laser assembly comprising a laser and an active laser guarding system comprising at least one screen provided with at least two spaced apart conductors each defining a respective electrically conductive path that is electrically separate from the other, the screen comprising material at least between the two conductors which is arranged to carbonise when struck by a laser beam from the laser to form a further conductive path which extends between and electrically connects the two conductors, the system further comprising a detector operative to detect any further conductive path so formed, the detector being operative to generate a laser deactivation signal in response to detecting the further conductive path.

According to a third aspect of the invention there is provided a laser enclosure comprising an active laser guarding system comprising at least one screen provided with at least two spaced apart conductors each defining a respective electrically conductive path that is electrically separate from the other, the screen comprising material at least between the two conductors which is arranged to carbonise when struck by a laser beam to form a further conductive path which extends between, and electrically connects, the two conductors, the system further comprising a detector operative to detect any further conductive path so formed, the detector being operative to generate a laser deactivation signal in response to detecting the further conductive path.

The enclosure may comprise multiple screens connected together to form a screen assembly.

Other aspects of the present invention may include any combination of the features or limitations referred to herein.

The foregoing and other objects, features, and advantages of embodiments disclosed herein will become more apparent from the following detailed description, which proceeds with reference to the accompanying figures.

BRIEF DESCRIPTION OF THE DRAWINGS

The present invention may be carried into practice in various ways, but embodiments will now be described by way of example only with reference to the accompanying drawings in which.

DETAILED DESCRIPTION

Figure 1:
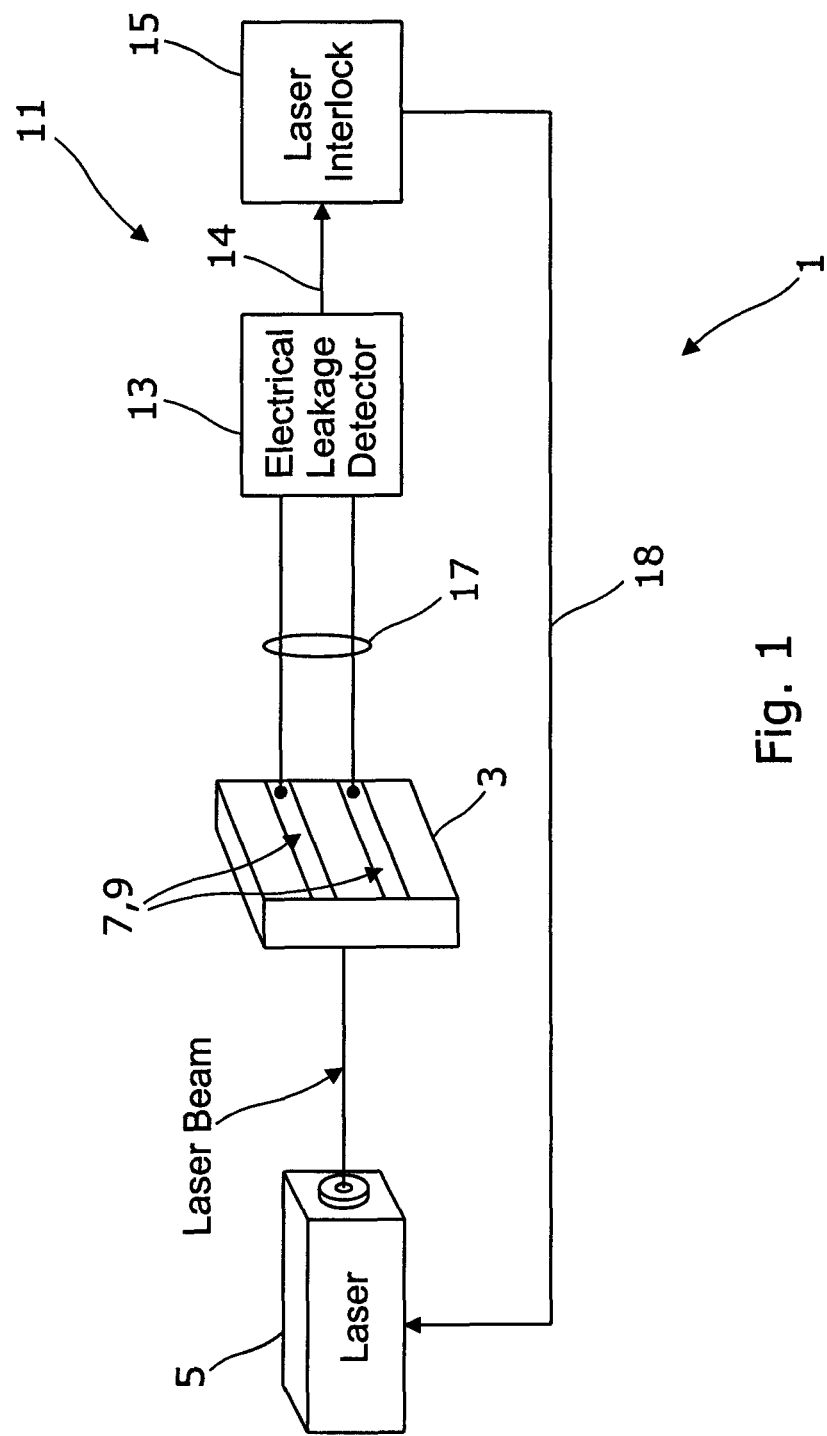
FIG. 1 is a schematic view of an embodiment of an active laser guarding system in accordance with the present invention.

Referring initially to FIG. 1 an active laser guarding system 1 comprises a screen 3 for locating between a laser 5 and an object to be protected.

The screen 3, in this example, can comprise a planar, oblong sheet of FR4 specification PCB on which at least two spaced apart elongate conductors 7, 9 are provided, each extending across the width of the screen 3. Each conductor 7, 9 defines a respective electrically conductive path, electrically separate from that of the other conductor 7, 9.

The conductors 7, 9 are electrically connected to an electronic controller 11 which comprises a detector 13 and a laser control circuit 15. The laser control circuit 15 is operative to generate a control signal which allows the laser 5 to be activated and deactivated. The control signal is used by a separate laser activation circuit (not shown) which activates or deactivates the laser 5 according to the control signal from the laser control circuit 15. The conductors 7, 9 are also connected to an electrical power source which may be provided by the controller 11. The conductors 7, 9 and controller 11 comprise an active monitoring circuit which monitors, activates and deactivates the laser 5 as required.

The detector 13 is operative to detect the flow of electricity along each conductor 7, 9 and to generate an output signal 14 in dependence upon the flow detected. If no flow is detected, the output signal comprises a laser deactivation signal indicative that one or both conductors 7, 9 have been broken and the control circuit 15 is operative to control deactivation of the laser 5.

The detector 13 is also operative to detect the resistance between the conductors 7, 9 and is again operative to generate an output signal 14 indicative of any change of resistance detected that is used by the control circuit 15 to deactivate the laser 5. The resistance is detected over a connection 17 between the conductors 7, 9.

The screen 3, or at least the part of the screen 3 between the two conductors 7, 9, is formed from a material arranged to carbonise when struck by a potentially hazardous laser beam. Any material containing sufficient carbon content can be used. In this example a PCB is used. The material used can be selected in dependence upon the type of laser in question, and the power and wavelength of the emitted laser beam.

When a beam from the laser 5 is incident on the screen 3 adjacent one or other conductor 7, 9, the area at, or adjacent which, the beam is incident carbonises the solid sheet material. We have determined that this region of carbonisation forms a further electrically conductive path 19 that extends between the two conductors 7, 9. This further conductive path 19 reduces the resistance between the two conductors 7, 9, this reduction in resistance being detected by the detector 13 via the resistance measurement taken at connection 17. This reduction in resistance is used by the detector 13 to generate a laser deactivation signal which is processed by the laser control circuit 15 to generate a control signal 18 to deactivate the laser 5, via a separate laser activation circuit (not shown).

The above described system 1 thus solves the problem caused by carbonisation around the area of incidence of the laser beam not breaking the conductive path because system 1 uses the conductive properties of the carbonisation to deactivate the laser 5, rather than requiring the conductive path to be cut to deactivate the laser 5.

The above described system 1 can be used in any situation where it may be required or desired to actively guard against laser beams accidentally being misdirected. Thus the screen 3 could comprise a simple wall panel for example, or could form a lining to a laser enclosure such as a cabinet or a room of a building. If used in an enclosure multiple screens 3 can be connected together as required to form a screen assembly. The screen assembly may cover the walls, ceiling and/or floor of the enclosure as required. A supporting framework (not shown) may be provided on which the screens 3 are mounted.

The screen 3 may comprise a connector to enable multiple screens 3 to be quickly and removably connected together. In this way a damaged screen 3 may be easily replaced. The screens 3 may therefore be modular. For example each screen 3 may be provided with a snap or push fit connector that mates with a corresponding connector on the adjacent screen (s) 3. Each screen 3 may be of a standard size, or bespoke sizes may be provided in cases where the standard size screens 3 cannot fit precisely.

Figure 2:
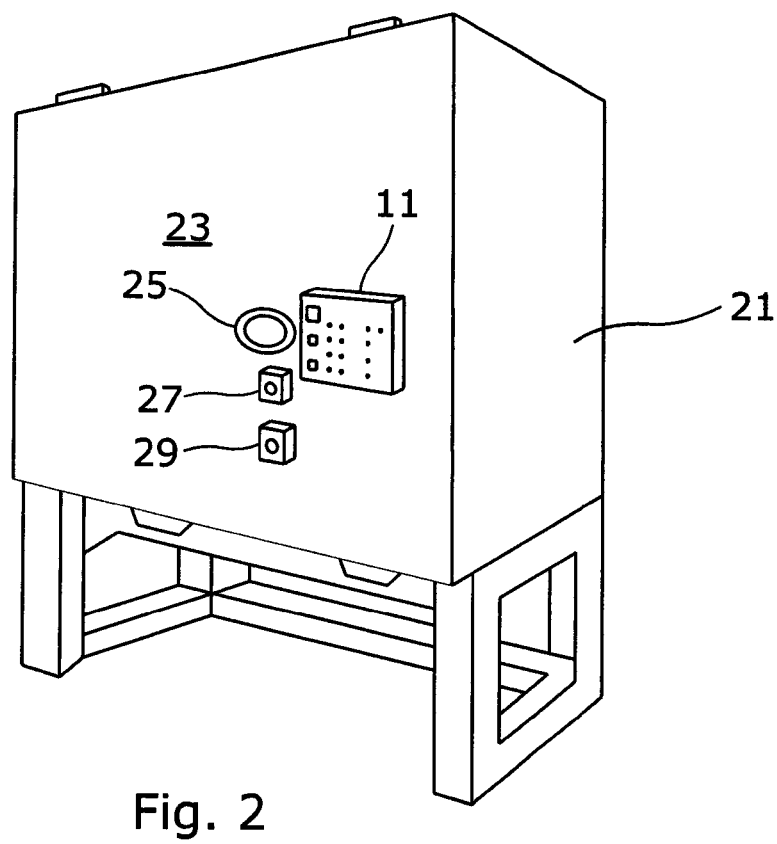
FIG. 2 is a perspective view from the front and one side of a laser enclosure incorporating the system of FIG. 1.
Figure 3:
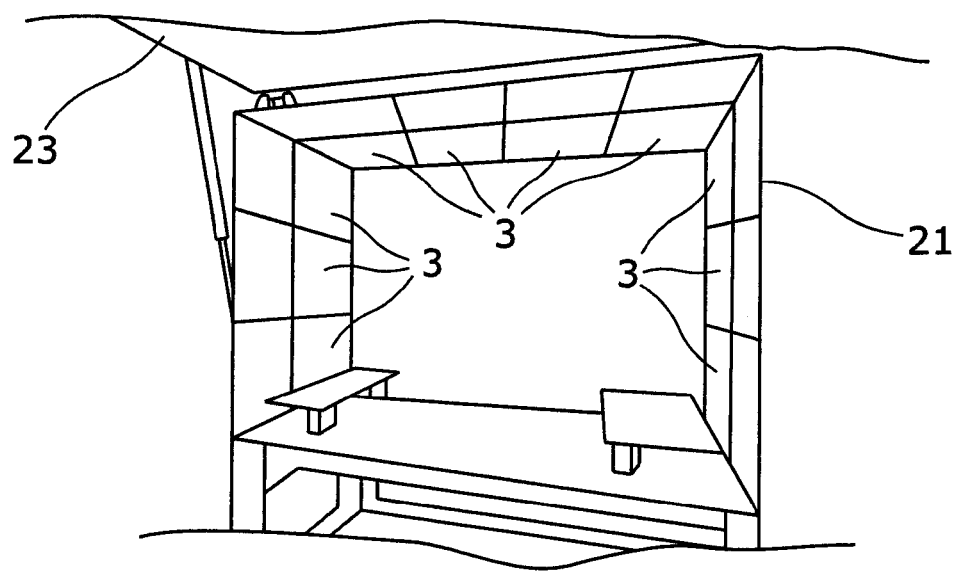
FIG. 3 is a perspective view from the front and one side of part of the enclosure of FIG. 2, with an access door of the enclosure in an open condition.

Referring additionally to FIGS. 2 and 3, a laser enclosure 21 is provided with a system 1 as described above, the interior of the enclosure 21 being lined with a screen assembly comprising multiple screens 3 connected together. The enclosure 21 comprises a hinged access door 23, which may also be lined with screens 3. The exterior of the access door 23 is provided with a warning sign 25 indicative of whether the laser 5 is switched on or off, as well as with a laser arming button 27 and an emergency stop button 29. The controller 11 may be operative to control an interlock provided to lock the door 23 in a closed position when the laser 5 is activated.

Figure 4:
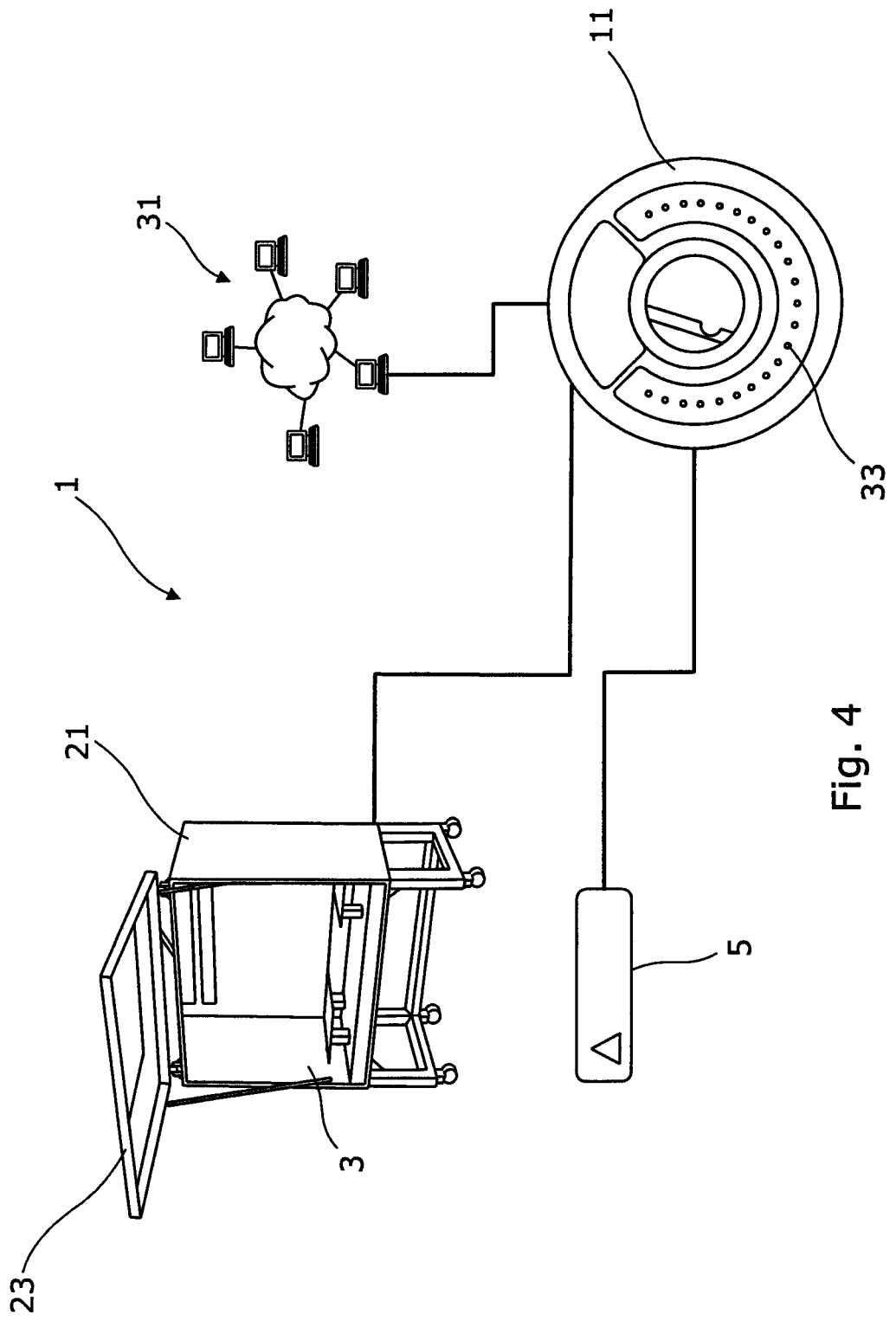
FIG. 4 is a schematic view of a further active laser guarding system in accordance with the present invention.

Referring additionally to FIG. 4, the system 1 is in use with a laser 5 located in an enclosure 21. In this example, the controller 11 is connected to a remote monitoring network 31 which is operative to monitor the arming/disarming of the laser 5, and which screens 3, if any, are damaged. The controller 11 is provided with a display, in this case an array of LEDs 33, that can alert the operator to the status of the laser 5, and the various screens 3.

Each screen 3 may be provided with more than two conductors 7, 9 if required. The conductors 7, 9 may comprise any suitable electrically conductive material such as wire or metal strips for example, or printed sections of a PCB.

The screen 3 may be formed from, or include, any material that carbonises when subject to the intensified energy of a laser beam. The screens 3 can readily be formed from relatively thin sheet material in the form of tiles or panels that facilitate the construction of a barrier, or lining over a relatively large area.

The output from the detector 13 can be used to control any required safety features which may include the deactivation of the laser 5, the activation of a door lock to prevent access to the area in which the laser 5 is used, the activation of a fire extinguishing system, the activation of a visible or aural alarm, and/or the generation of an error message or report to the operator.

The above described system 1 is advantageously of relatively low cost.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. An active laser guarding system comprising at least one screen provided with at least two spaced apart conductors each defining a respective electrically conductive path that is electrically separate from the other, the screen comprising material, at least between the two conductors, which is arranged to carbonise when struck by a laser beam to form a further conductive path which extends between, and electrically connects, the two conductors, the system further comprising a detector operative to detect the further conductive path so formed, the detector being operative to generate a laser deactivation signal in response to detecting the further conductive path.

2. The system of claim 1 wherein each conductor is elongate so as to extend along at least part of the screen.

3. The system of claim 2 wherein each conductor extends across the entire screen.

4. The system of claim 1 wherein more than two conductors are provided.

5. The system of claim 1 wherein the detector is also operative to detect if one, some or all conductor(s) is electrically broken and to generate the laser deactivation signal in response to detecting the broken conductor(s).

6. The system of claim 1 wherein the screen comprises a printed circuit board (PCB).

7. The system of claim 1 wherein the screen is of sheet form.

8. The system of claim 1 wherein the screen comprises a connector to enable the screen to be physically and electrically connected to another screen.

9. The system of claim 8 wherein the connector comprises electrical sub connectors which connect the conductors of one screen to the conductors of an adjacent screen.

10. A laser assembly comprising a laser and an active laser guarding system comprising at least one screen provided with at least two spaced apart conductors each defining a respective electrically conductive path that is electrically separate from the other, the screen comprising material at least between the two conductors which is arranged to carbonise when struck by a laser beam from the laser to form a further conductive path which extends between and electrically connects the two conductors, the system further comprising a detector operative to detect any further conductive path so formed, the detector being operative to generate a laser deactivation signal in response to detecting the further conductive path.

11. A laser enclosure comprising an active laser guarding system comprising at least one screen provided with at least two spaced apart conductors each defining a respective electrically conductive path that is electrically separate from the other, the screen comprising material at least between the two conductors which is arranged to carbonise when struck by a laser beam to form a further conductive path which extends between, and electrically connects, the two conductors, the system further comprising a detector operative to detect any further conductive path so formed, the detector being operative to generate a laser deactivation signal in response to detecting the further conductive path.

* * * * *